US011329750B2

(12) United States Patent
Wu et al.

(10) Patent No.: US 11,329,750 B2
(45) Date of Patent: May 10, 2022

(54) SEQUENCE TRANSMISSION FOR SIDELINK COMMUNICATIONS

(71) Applicant: QUALCOMM Incorporated, San Diego, CA (US)

(72) Inventors: Shuanshuan Wu, San Diego, CA (US); Kapil Gulati, Hillsborough, NJ (US); Sudhir Kumar Baghel, Hillsborough, NJ (US); Arthur Gubeskys, San Diego, CA (US); Arjun Bharadwaj, Cupertino, CA (US); Tien Viet Nguyen, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/828,491

(22) Filed: Mar. 24, 2020

(65) Prior Publication Data

US 2020/0389246 A1 Dec. 10, 2020

Related U.S. Application Data

(60) Provisional application No. 62/858,665, filed on Jun. 7, 2019.

(51) Int. Cl.
*H04W 4/00* (2018.01)
*H04J 13/00* (2011.01)
(Continued)

(52) U.S. Cl.
CPC ........ *H04J 13/0022* (2013.01); *H04L 5/0094* (2013.01); *H04W 52/52* (2013.01); *H04W 72/0446* (2013.01); *H04W 92/18* (2013.01)

(58) Field of Classification Search
CPC ....... H04L 5/0094; H04L 27/26; H04L 27/08; H04W 52/52; H04W 72/0446; H04W 92/18
See application file for complete search history.

(56) References Cited

U.S. PATENT DOCUMENTS

| 6,748,006 B1* | 6/2004 | McDonough | ........ | H04B 1/7085 |
| | | | | 375/140 |
| 2007/0082696 A1* | 4/2007 | Wang | .................. | H04L 27/2613 |
| | | | | 455/550.1 |

(Continued)

OTHER PUBLICATIONS

INTEL Corporation: "Synchronization Design for NR V2X Sidelink Communication," 3GPP Draft, 3GPP TSG RAN WG1 Meeting #97, R1-1906797 INTEL-EV2X SLSYNC, 3rd Generation Partnership Project (3GPP), Mobile Competence Centre, 650, Route Des Lucioles, F-06921, Sophia-Antipolis Cedex, France, vol. RAN WG1.No. Reno, USA; May 13, 2019-May 17, 2019, May 13, 2019 (May 13, 2019), XP051728248, pp. 1-17, Retrieved from the Internet:URL: http://www.3gpp.org/ftp/Meetings%5F3GPP%5FSYNC/RAN1/Docs/R1%2D1906797%2Ezip [retrieved on May 13, 2019]Proposal 12: section 2.2.1-2.2.7;Figure 2.5.

(Continued)

*Primary Examiner* — Abdelnabi O Musa
(74) *Attorney, Agent, or Firm* — Harrity & Harrity, LLP

(57) ABSTRACT

Various aspects of the present disclosure generally relate to wireless communication. In some aspects, a user equipment may generate a pseudorandom noise (PN) sequence, modulate the PN sequence based at least in part on a modulation order parameter, and transmit the PN sequence in one or more symbols prior to transmitting sidelink data. The one or more symbols used to transmit the PN sequence may be used for automatic gain control (AGC) training at a receiving device. The user equipment may then transmit the sidelink data in a plurality of symbols that are subsequent in time relative to the one or more symbols used to transmit the PN sequence, and the receiving device may process the sidelink data based on the AGC training. Numerous other aspects are provided.

30 Claims, 11 Drawing Sheets

(51) Int. Cl.
*H04W 52/52* (2009.01)
*H04W 72/04* (2009.01)
*H04L 5/00* (2006.01)
*H04W 92/18* (2009.01)

(56) References Cited

U.S. PATENT DOCUMENTS

| | | | | |
|---|---|---|---|---|
| 2008/0204319 A1* | 8/2008 | Niu | ...................... | H04B 7/0617 |
| | | | | 342/368 |
| 2009/0225741 A1* | 9/2009 | Wang | .................. | H04L 27/2605 |
| | | | | 370/345 |
| 2013/0177112 A1* | 7/2013 | Lan | ...................... | H03G 3/3078 |
| | | | | 375/345 |
| 2013/0315321 A1* | 11/2013 | Rajagopal | ............. | H04L 27/261 |
| | | | | 375/260 |
| 2016/0278013 A1* | 9/2016 | Shellhammer | .... | H04W 52/0229 |
| 2019/0364585 A1* | 11/2019 | Lee | ...................... | H04L 5/0044 |

OTHER PUBLICATIONS

International Search Report and Written Opinion—PCT/US2020/030705—ISA/EPO—dated Aug. 7, 2020.

* cited by examiner

SEQUENCE TRANSMISSION FOR SIDELINK COMMUNICATIONS

CROSS-REFERENCE TO RELATED APPLICATION

This patent application claims priority to U.S. Provisional Patent Application No. 62/858,665, filed on Jun. 7, 2019, entitled "SEQUENCE TRANSMISSION FOR SIDELINK COMMUNICATIONS," and assigned to the assignee hereof. The disclosure of the prior Application is considered part of and is incorporated by reference in this Patent Applications.

FIELD OF THE DISCLOSURE

Aspects of the present disclosure generally relate to wireless communication and to techniques and apparatuses for sequence transmission for sidelink communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include generating a pseudorandom noise (PN) sequence; modulating the PN sequence based at least in part on a modulation order parameter; transmitting the PN sequence in one or more symbols prior to transmitting sidelink data; and transmitting the sidelink data in a plurality of symbols that are subsequent in time relative to the one or more symbols used to transmit the PN sequence.

In some aspects, a method of wireless communication, performed by a UE, may include receiving one or more automatic gain control (AGC) symbols carrying a modulated PN sequence in one or more symbols prior to receiving sidelink data; configuring a gain for one or more receive components based on one or more signal characteristics associated with the one or more AGC symbols; receiving the sidelink data in a plurality of symbols that are subsequent in time relative to the one or more symbols in which the one or more AGC symbols carrying the modulated PN sequence are received; and applying the configured gain to process the sidelink data.

In some aspects, a UE for wireless communication may include a memory and one or more processors operatively coupled to the memory. The memory and the one or more processors may be configured to generate a PN sequence; modulate the PN sequence based at least in part on a modulation order parameter; transmit the PN sequence in one or more symbols prior to transmitting sidelink data; and transmit the sidelink data in a plurality of symbols that are subsequent in time relative to the one or more symbols used to transmit the PN sequence.

In some aspects, a UE for wireless communication may include a memory and one or more processors operatively coupled to the memory. The memory and the one or more processors may be configured to receive one or more AGC symbols carrying a modulated PN sequence in one or more symbols prior to receiving sidelink data; configure a gain for one or more receive components based on one or more signal characteristics associated with the one or more AGC symbols; receive the sidelink data in a plurality of symbols that are subsequent in time relative to the one or more symbols in which the one or more AGC symbols carrying the modulated PN sequence are received; and apply the configured gain to process the sidelink data.

In some aspects, a non-transitory computer-readable medium may store one or more instructions for wireless communication. The one or more instructions, when executed by one or more processors, may cause the one or more processors to: generate a PN sequence; modulate the PN sequence based at least in part on a modulation order parameter; transmit the PN sequence in one or more symbols prior to transmitting sidelink data; and transmit the sidelink data in a plurality of symbols that are subsequent in time relative to the one or more symbols used to transmit the PN sequence.

In some aspects, a non-transitory computer-readable medium may store one or more instructions for wireless communication. The one or more instructions, when executed by one or more processors, may cause the one or more processors to: receive one or more AGC symbols carrying a modulated PN sequence in one or more symbols prior to receiving sidelink data; configure a gain for one or more receive components based on one or more signal characteristics associated with the one or more AGC symbols; receive the sidelink data in a plurality of symbols that are subsequent in time relative to the one or more symbols in which the one or more AGC symbols carrying the modulated PN sequence are received; and apply the configured gain to process the sidelink data.

In some aspects, an apparatus for wireless communication may include means for generating a PN sequence; means for modulating the PN sequence based at least in part on a modulation order parameter; means for transmitting the PN sequence in one or more symbols prior to transmitting sidelink data; and means for transmitting the sidelink data in a plurality of symbols that are subsequent in time relative to the one or more symbols used to transmit the PN sequence.

In some aspects, an apparatus for wireless communication may include means for receiving one or more AGC symbols carrying a modulated PN sequence in one or more symbols prior to receiving sidelink data; means for configuring a gain for one or more receive components based on one or more signal characteristics associated with the one or more AGC symbols; means for receiving the sidelink data in a plurality of symbols that are subsequent in time relative to the one or more symbols in which the one or more AGC symbols carrying the modulated PN sequence are received; and means for applying the configured gain to process the sidelink data.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
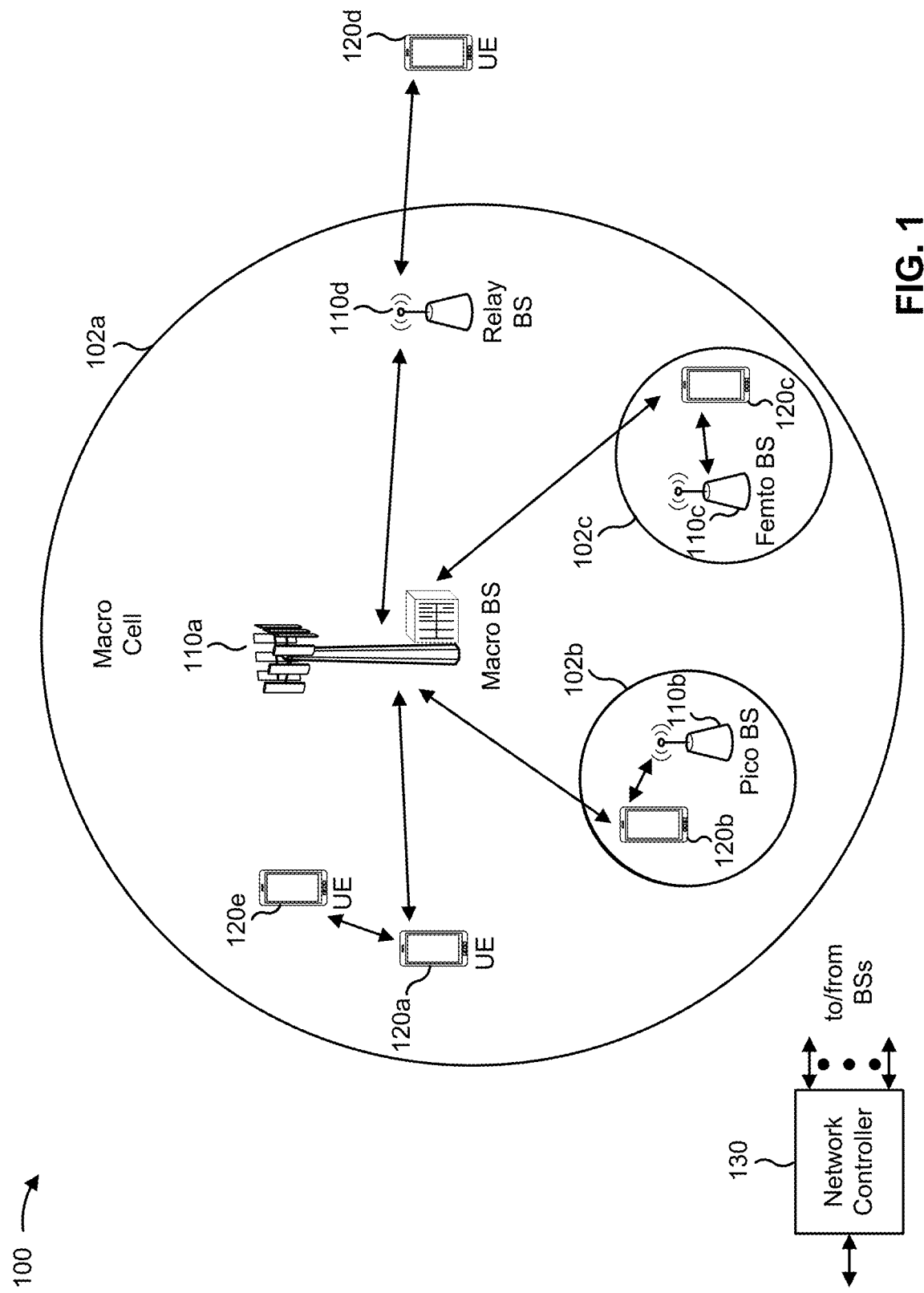
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another).

For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
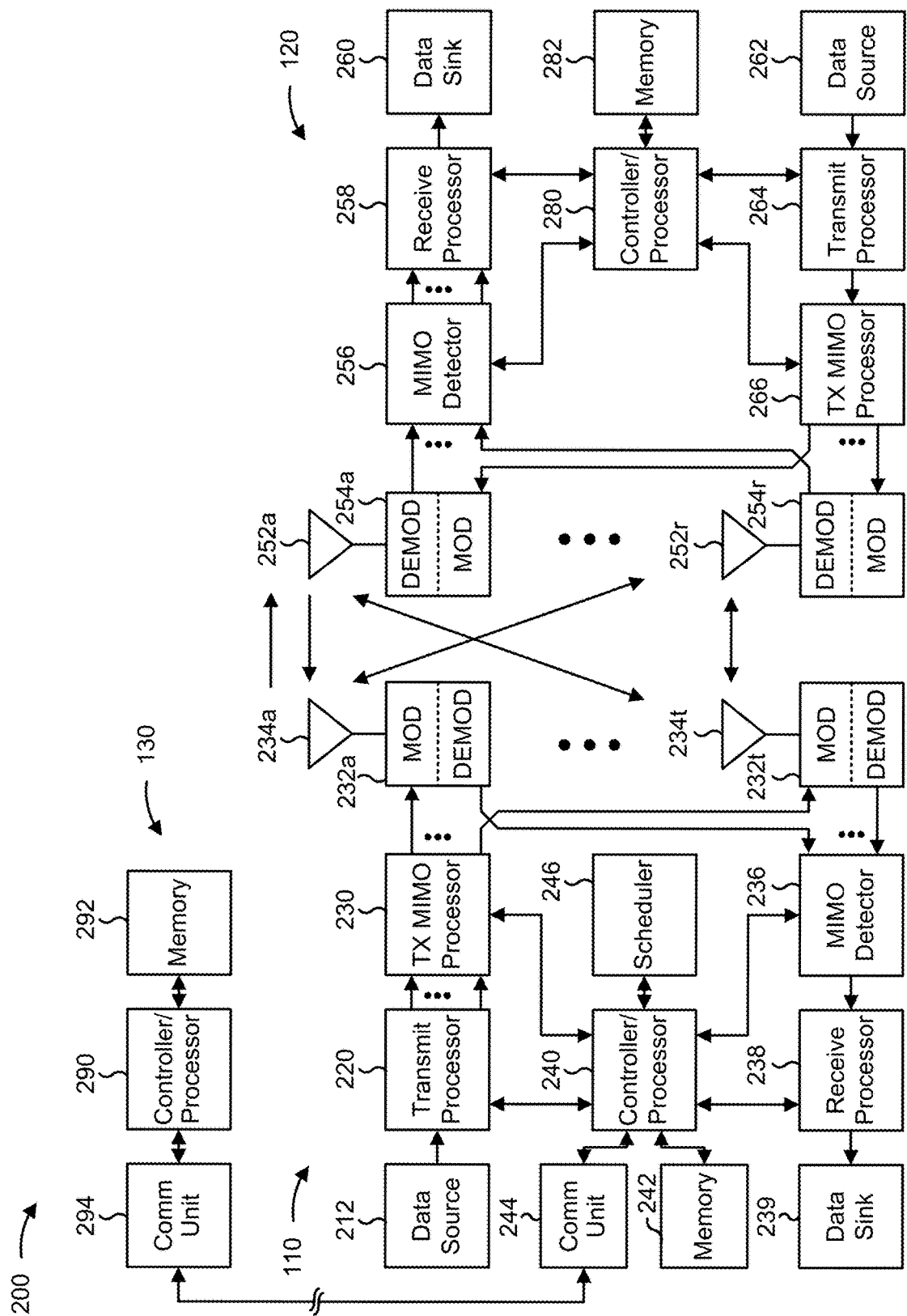
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with sequence transmissions for sidelink communications, as described in more detail elsewhere herein. For example, controller/processor 240 of base station 110, controller/processor 280 of UE 120, and/or any other component(s) of FIG. 2 may perform or direct operations of, for example, process 1000 of FIG. 10, process 1100 of FIG. 11, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for generating a pseudorandom noise (PN) sequence, means for modulating the PN sequence based at least in part on a modulation order parameter, means for transmitting the PN sequence in one or more symbols prior to transmitting sidelink data, and means for transmitting the sidelink data in a plurality of symbols that are subsequent in time relative to the one or more symbols used to transmit the PN sequence. In some aspects, such means may include one or more components of UE 120 described in connection with FIG. 2. Furthermore, in some aspects, the modulated PN sequence may be used for automatic gain control (AGC) training at a device that receives the modulated PN sequence that UE 120 transmits in the one or more symbols that are earlier in time relative to the symbols used to transmit the sidelink data.

Additionally, or alternatively, in some aspects UE 120 may include means for receiving one or more AGC symbols carrying a modulated PN sequence in one or more symbols prior to receiving sidelink data, means for configuring a gain for one or more receive components based on one or more signal characteristics associated with the one or more AGC symbols, means for receiving the sidelink data in a plurality of symbols that are subsequent in time relative to the one or more symbols in which the one or more AGC symbols carrying the modulated PN sequence are received, and means for applying the configured gain to process the sidelink data. In some aspects, such means may include one or more components of UE 120 described in connection with FIG. 2.

As indicated above, FIG. 2 is provided as an example. Other examples may differ from what is described with regard to FIG. 2.

Figure 3:
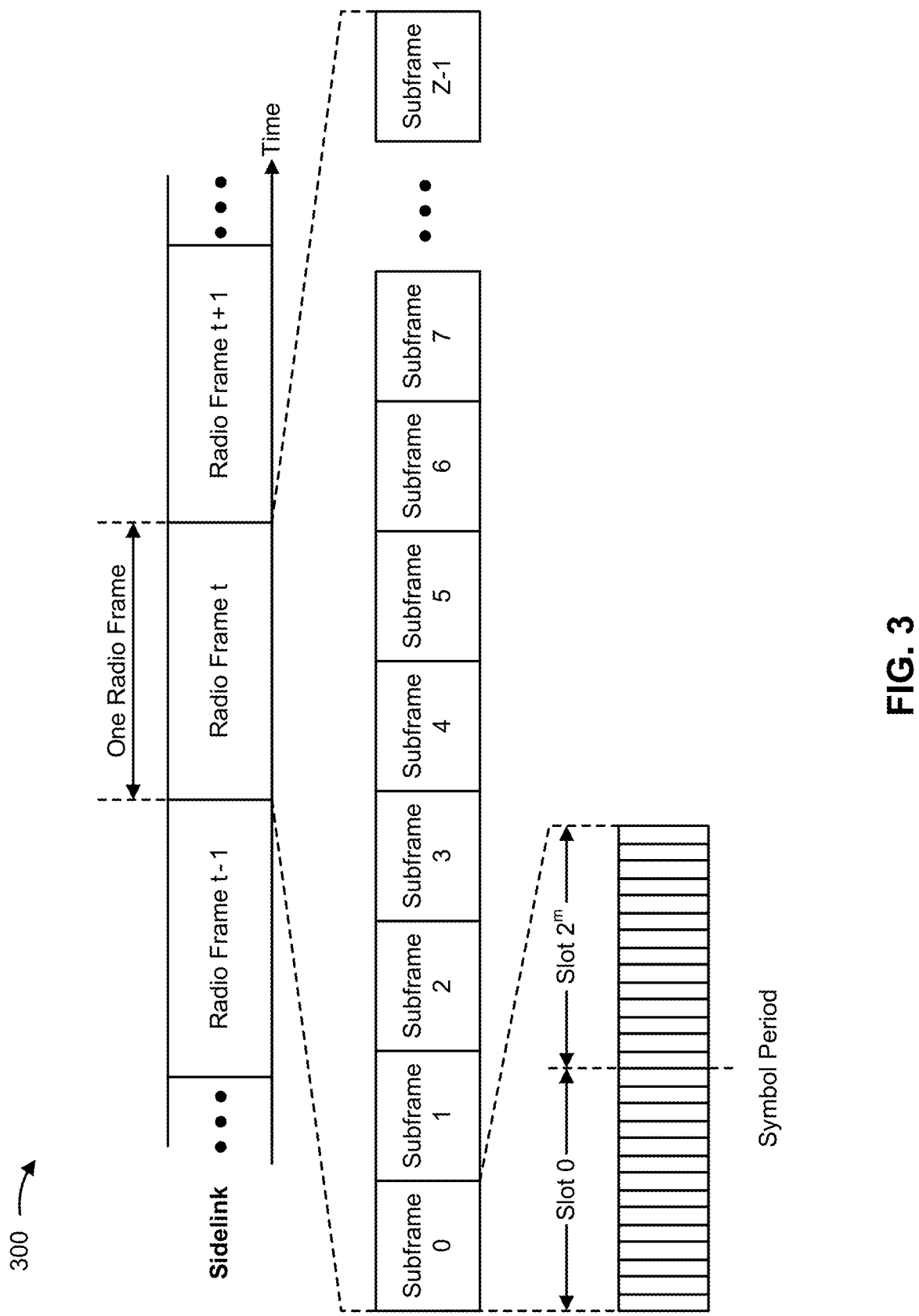
FIG. 3 is a block diagram conceptually illustrating an example of a frame structure in a wireless communication network, in accordance with various aspects of the present disclosure.

FIG. 3 shows an example frame structure 300 for frequency division duplexing (FDD), on a sidelink between UEs, in a telecommunications system (e.g., LTE, 5G NR, and/or the like). The transmission timeline for the sidelink may be partitioned into units of radio frames (sometimes referred to as frames), where t represents time. Each radio frame may have a predetermined duration (e.g., 10 milliseconds (ms)) and may be partitioned into a set of Z ($Z \geq 1$) subframes (e.g., with indices of 0 through Z-1). Each subframe may have a predetermined duration (e.g., 1 ms) and may include a set of slots (e.g., $2^m$ slots per subframe are shown in FIG. 3, where m is a numerology used for a transmission, such as 0, 1, 2, 3, 4, and/or the like). Each slot may include a set of L symbol periods. For example, each slot may include fourteen symbol periods (e.g., as shown in FIG. 3), seven symbol periods, or another number of symbol periods. In a case where the subframe includes two slots (e.g., when m=1), the subframe may include 2L symbol periods, where the 2L symbol periods in each subframe may be assigned indices of 0 through 2L-1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3 may be used.

In certain telecommunications (e.g., NR), a base station may transmit synchronization signals. For example, a base station may transmit a primary synchronization signal (PSS), a secondary synchronization signal (SSS), and/or the like, on a downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs. In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks).

As indicated above, FIG. 3 is provided as an example. Other examples may differ from what is described with regard to FIG. 3.

Figure 4:
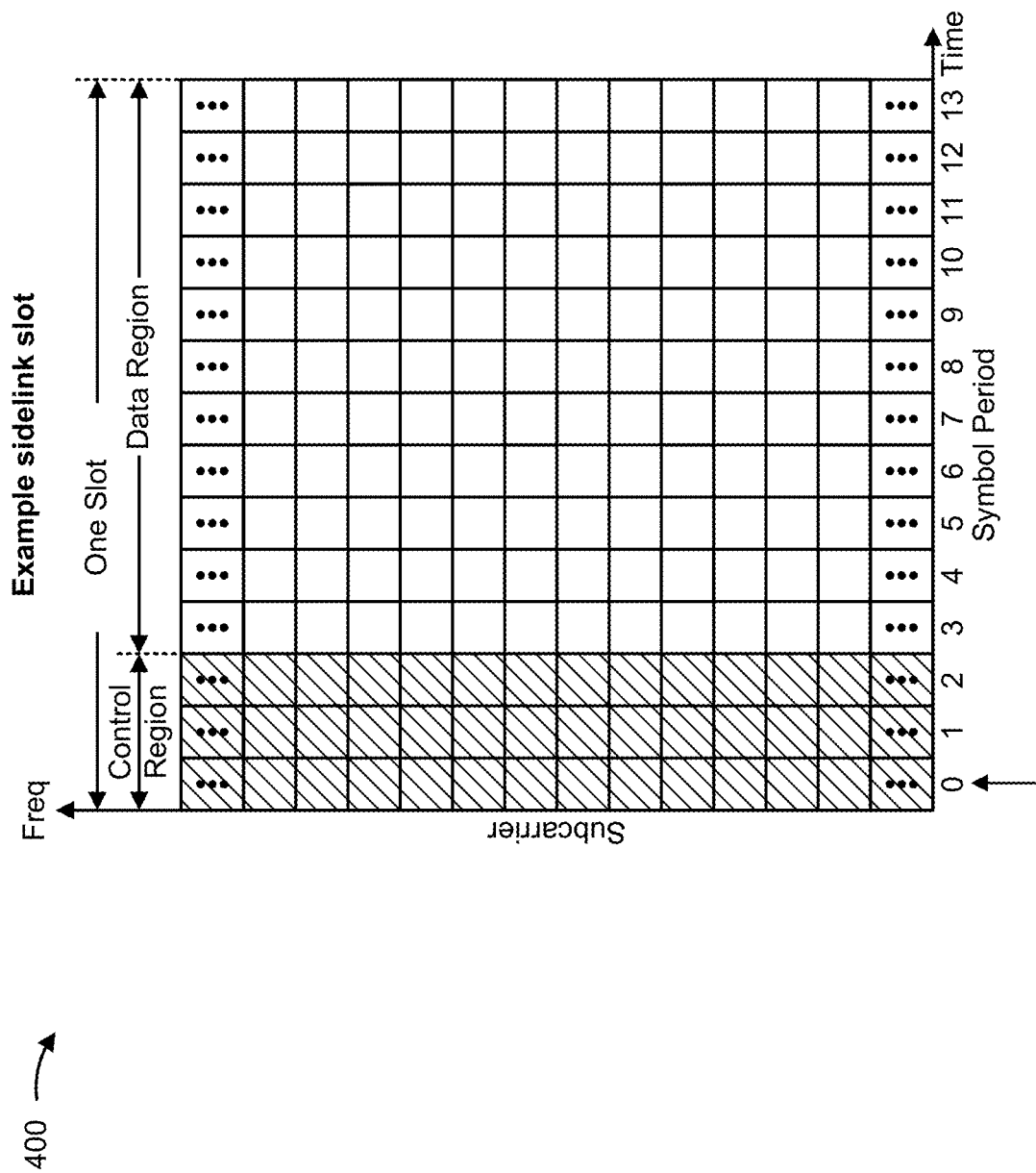
FIG. 4 is a block diagram conceptually illustrating an example slot format with a normal cyclic prefix, in accordance with various aspects of the present disclosure.

FIG. 4 shows an example slot format 400 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value. For example, as shown in FIG. 4, an earliest OFDM symbol in the slot may include one or more resource elements that are used to send an AGC symbol from a transmitting device to a receiving device, as described in further detail elsewhere herein.

An interlace structure may be used for the sidelink for FDD in certain telecommunications systems (e.g., LTE, 5G NR, and/or the like). For example, Q interlaces with indices of 0 through Q-1 may be defined, where Q may be equal to 4, 6, 8, 10, or some other value. Each interlace may include slots that are spaced apart by Q frames. In particular, interlace q may include slots q, q+Q, q+2Q, and/or the like, where $q \in \{0, \ldots, Q-1\}$.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In some aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra-reliable low-latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction for data transmission and the link direction for each slot may be dynamically switched. Each sidelink slot may include a data region including one or more symbols for communicating sidelink data as well as a control region including one or more symbols for communicating control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

In some circumstances, two or more subordinate entities (e.g., UEs) may communicate with each other using sidelink signals. Real-world applications of such sidelink communications may include public safety, proximity services, UE-to-network relaying, device-to-device (D2D) communications, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., a first UE) to another subordinate entity (e.g., a second UE) without relaying that communication through a scheduling entity (e.g., a BS), even though the scheduling entity may be utilized for scheduling and/or control purposes. In some aspects, the sidelink signals may be communicated using a licensed spectrum (unlike wireless local area networks, which typically use an unlicensed spectrum).

Because sidelink communications occur between subordinate entities, there can be significant variation in sidelink signal characteristics (e.g., signal power, noise, interference, and/or the like) from one slot to the next (or from one transmission to the next). For example, a UE that transmits sidelink data in a current slot may or may not transmit again in a subsequent slot. In another example, a UE that is not transmitting sidelink data in a current slot may start to transmit sidelink data in a subsequent slot. Accordingly, because sidelink communications occur between subordinate entities without using a base station as an intermediary, the sidelink signal characteristics can vary depending on the UEs that are engaged in sidelink communications in a given area at a given time. This is in contrast to wireless communications that traverse a base station, which generally use power control and/or other mechanisms to maintain relatively stable signal characteristics that do not exhibit significant fluctuations in signal power.

Accordingly, in sidelink communications, a receiving device that may be attempting to receive a signal for a particular slot may perform automatic gain control (AGC) training, which refers to mechanisms to tune or otherwise configure a radio frequency front end (RFFE) and/or other receive components to match the received signal power and thereby prevent the receive components from becoming saturated. For example, AGC is often implemented using one or more circuits (e.g., a closed-loop feedback regulating circuit) to maintain a stable signal level at an output stage regardless of variations in the signal level at an input stage. Accordingly, when the receiving device does not perform AGC training before attempting to receive sidelink data and/or performs AGC training using one or more OFDM symbols that are also used to communicate sidelink data, the OFDM symbol(s) used to communicate the sidelink data may not be received correctly, potentially leading to loss of the sidelink data.

Some aspects described herein provide techniques and apparatuses to communicate a modulated sequence (e.g., a pseudorandom noise (PN) sequence) in one or more OFDM symbols for the purpose of AGC training at a receiving UE prior to communicating sidelink data in subsequent OFDM symbols. For example, prior to communicating sidelink data, one or more OFDM symbols may be dedicated to communicating the modulated sequence to enable AGC training at the receiving UE, whereby the one or more OFDM symbols used to communicate the modulated sequence may be referred to herein as AGC symbols and/or the like. Accordingly, even if the one or more AGC symbols are lost or otherwise received incorrectly, there is no impact to sidelink data channel processing at the receiving UE (e.g., there may be no decoding error due to a loss of data symbols because the AGC symbols do not carry any sidelink data).

In some aspects, examples described herein may dedicate one or more OFDM symbols that are earliest in time within a slot to communicate the modulated sequence used to enable AGC training at the receiving UE. However, these examples are for illustration purposes only, as the AGC symbol(s) carrying the modulated sequence may be generally positioned in time prior to one or more OFDM symbols that are used to communicate sidelink data (e.g., when a channel and/or transmission does not start from an earliest symbol in a slot, as may be the case for a feedback channel).

Figure 5:
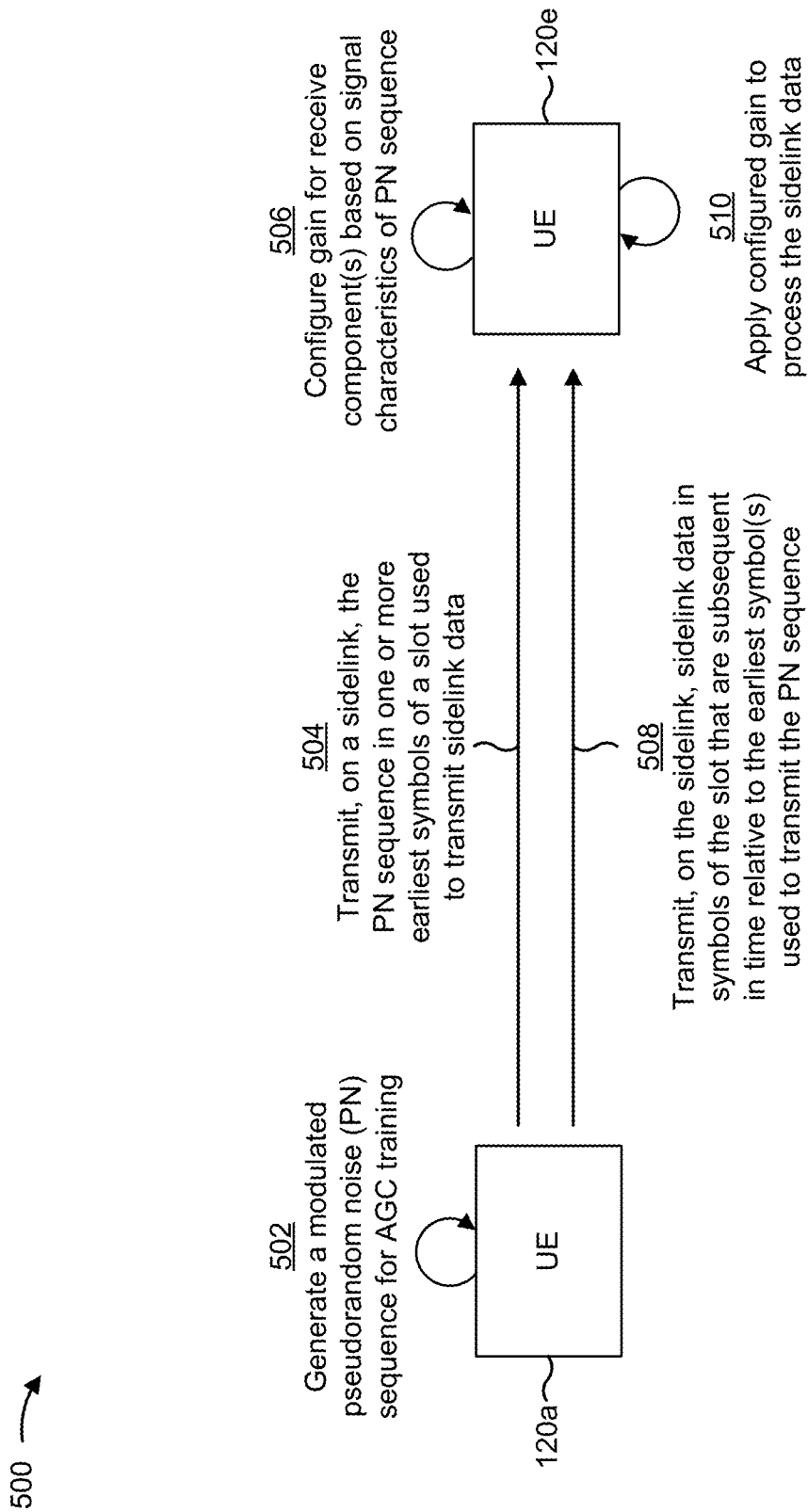
FIG. 5 is a block diagram illustrating an example sequence transmission for sidelink communications, in accordance with various aspects of the present disclosure.

FIG. 5 is a block diagram illustrating an example 500 of sequence transmission for sidelink communications, in accordance with various aspects of the present disclosure. As shown in FIG. 5, example 500 may include UE 120a and UE 120e communicating via a sidelink in a wireless network (e.g., wireless network 100). In some aspects, the sidelink may be configured with a frame structure, such as the frame structure 300 shown in FIG. 3 and/or another sidelink frame structure, and the sidelink may be configured with a slot format, such as the slot format 400 shown in FIG. 4 and/or another sidelink slot format. In example 500, UE 120a may be acting as a transmitter to transmit sidelink data to UE 120e, which may be acting as a receiver. However, in some cases, these roles may be dynamically switched.

As shown in FIG. 5, and by reference number 502, UE 120a may generate a modulated PN sequence to be used for AGC training by UE 120e. For example, the PN sequence may be a Gold sequence (also known as a Gold code) generated based on a multiplication of two maximum length sequences (m-sequences). In some aspects, at least one of the m-sequences used to generate the PN sequence may be initialized according to an initial sequence state, which may be based on one or more parameters that are selected to randomize potential interference with one or more PN sequences that may be transmitted by other UEs using the same resources as UE 120a. For example, the one or more parameters may include an index of a frame (e.g., a frame number) to be used to transmit the PN sequence, an index of a slot (e.g., a slot number) to be used to transmit the PN sequence, an index of an OFDM symbol (e.g., an OFDM symbol number) to be used to transmit the PN sequence, a configured identification, an index associated with a sub-channel to be used to transmit the PN sequence, an identification of UE 120a, a parameter including one or more integer values configured by a base station or network node, a random number, and/or the like.

Accordingly, when the index of the frame is used to initialize the PN sequence, the PN sequence may differ from one frame to another. Similarly, when the index of the slot is used to initialize the PN sequence, the PN sequence may differ from slot to slot, and the PN sequence may further differ from one OFDM symbol to another when the index of the OFDM symbol is used to initialize the PN sequence. In some aspects, the configured identification may be a particular identifier that UE 120a uses for the purpose of initializing the PN sequence. In some aspects, the index associated with the sub-channel to be used to transmit the PN sequence may be used for sidelink communications in which available data transmission bandwidth is partitioned into multiple sub-channels, in which case the PN sequence may be transmitted on multiple sub-channels and the index may be an index of a first one of the multiple sub-channels.

In some aspects, as mentioned above, initializing the PN sequence based on one or more of the parameters described above may randomize interference with other UEs that may be transmitting on the same resource(s). In particular, the parameters (or combination of parameters) that are used may be selected to ensure that the PN sequences transmitted by UE 120*a* are different from the PN sequence(s) that one or more other UEs are transmitting on the same resource(s), by varying a seed used to initialize the PN sequence. For example, if the initialization utilizes only the index of the frame, different UEs may generate the same PN sequence because the frame number is the same for all UEs. These PN sequences may be combined over-the-air, which may result in UE 120*e* that is intended to receive the PN sequence generated by UE 120*a* failing to correctly perform AGC training based on the PN sequence due to an overlap in AGC symbols. However, a data channel used by the different UEs may vary, whereby using other parameters that may be specific to a particular UE may randomize the respective PN sequences, which increases a likelihood that the UE 120*e* intended to receive the PN sequence will be able to correctly perform AGC training based on the PN sequence.

In some aspects, as mentioned above, the PN sequence may be a Gold sequence (or Gold code) that is generated based on two m-sequences, including at least one m-sequence initialized according to an initial sequence state, which may be denoted as $c_{init}$. For example, UE 120*a* may determine the initial sequence state based on the function $c_{init}=f(N_{symb}^{slot}, n_{s,f}^{\mu})$, where $N_{symb}^{slot}$ is a quantity of OFDM symbols in a slot, and $n_{s,f}^{\mu}$ is a slot number (index) within a frame; the function of $c_{init}=f(N_{symb}^{slot}, n_{s,f}^{\mu}, l)$, where l is an OFDM symbol number (index) within the slot; the function $c_{init}=f(N_{symb}^{slot}, n_{s,f}^{\mu}, n_{ID})$ where $n_{ID}$ is an identifier associated with UE 120*a* (e.g., a Layer 1 identifier assigned to UE 120*a* for V2X or other sidelink communications), and/or the like. In one specific example, UE 120*a* may determine the initial sequence state based on the function $c_{init}=2^{8}(N_{symb}^{slot}n_{s,f}^{\mu}+1)(2n_{ID}+1)+n_{ID}$.

In some aspects, in addition to configuring the initial sequence state based on one or more parameters as described above, UE 120*a* may determine various parameters for generating the modulated PN sequence. For example, the parameters for generating the modulated PN sequence may include a modulation order parameter ($Q_m$) for modulating the PN sequence, a quantity of earliest symbols in a slot to be dedicated to communicating the modulated PN sequence ($L_{AGC}$), a sidelink data channel transmission bandwidth ($N_{SC}$), a number of layers for the sidelink data transmission (v) (e.g., a number of antenna ports to be used to communicate the modulated PN sequence), and/or the like.

In some aspects, the modulation order parameter $Q_m$ for modulating the PN sequence may be predefined to be a particular modulation order independent of a modulation to be used for subsequent sidelink data transmissions. For example, the modulation order may be predefined to be Quadrature Phase Shift Keying (QPSK) modulation. In this case, a quantity of ports to be used to transmit the modulated PN sequence may be predefined (e.g., transmission of the modulated PN sequence may be fixed to be a one-port or one-layer transmission, a two-port or two-layer transmission, and/or the like). Additionally, or alternatively, a quantity of ports to be used to transmit the modulated PN sequence may be equivalent to a quantity of ports to be used for sidelink data transmissions (e.g., after the modulated PN sequence is transmitted).

Additionally, or alternatively, the modulation order parameter $Q_m$ for modulating the PN sequence may be based on a modulation scheme to be used for the sidelink data transmissions to be performed subsequent to transmitting the modulated PN sequence. For example, when the modulation scheme to be used for the sidelink data transmissions is 16 quadrature amplitude modulation (QAM), the modulation order for the PN sequence may also be 16 QAM, which results in $Q_m$ having a value of 4. In other examples, the modulation order for the sidelink data transmissions and the PN sequence may be 64 QAM (in which case $Q_m$=6), 256 QAM (in which case $Q_m$=8), QPSK (in which case $Q_m$=2), and/or the like. In this case, by using the same modulation order for the PN sequence and the subsequent data transmissions, resources are conserved at UE 120*a* and UE 120*e* because the PN sequence that is transmitted in the first one or few symbols of a slot for AGC training may have the same physical layer processing as the subsequent symbols used to transmit sidelink data.

Furthermore, in some aspects, UE 120*a* may determine one or more additional parameters for modulating the PN sequence that are based on physical layer processing used for subsequent sidelink data transmissions. For example, a quantity of antenna ports that UE 120*a* uses to transmit the modulated PN sequence may be equivalent to a quantity of antenna ports to be used by UE 120*a* for the sidelink data transmissions (e.g., when the sidelink data is a two-port transmission, meaning that there are two ports of demodulation reference signals (DMRS) for the sidelink data, the PN sequence may also be transmitted using the same two ports). Furthermore, when UE 120*a* applies precoding to the sidelink data transmissions, UE 120*a* may apply the same precoding to the modulated PN sequence used for AGC training at UE 120*e*.

In some aspects, UE 120*a* may further determine the quantity of earliest symbols in a slot to be dedicated to communicating the modulated PN sequence, denoted herein as $L_{AGC}$. For example, UE 120*a* may generate a PN sequence based on the initial sequence state as described above, modulate the PN sequence according to the modulation order parameter $Q_m$, and determine a mapping between the modulated PN sequence and the earliest $L_{AGC}$ available OFDM symbols in a slot to be used for sidelink data transmissions, where $L_{AGC}$ is an integer having a value greater than or equal to one. For example, $L_{AGC}$ may have a predefined value (e.g., fixed to be one, two, and/or the like). Additionally, or alternatively, $L_{AGC}$ may have a value that depends on a sub-carrier spacing (e.g., $L_{AGC}$ may be one when the sub-carrier spacing is 15 kHz or 30 kHz, two when the sub-carrier spacing is 60 kHz, and/or the like).

In some aspects, UE 120*a* may further determine a length for the PN sequence to be modulated based on various parameters that relate to the sidelink data channel between UE 120*a* and UE 120*e*, the value for $L_{AGC}$, a quantity of OFDM symbols to be mapped to the PN sequence, and/or the like. For example, in cases where the PN sequence is transmitted in one OFDM symbol that is earliest in a slot and/or the same PN sequence is repeated in multiple OFDM symbols at the start of a slot, UE 120*a* may determine the length of the PN sequence based on the transmission bandwidth of the data, $N_{sc}$, expressed as a quantity of sub-carriers or resource elements (REs), the modulation order $Q_m$, and a quantity of antenna ports (or layers) transmitting the data (v). In this case, the PN sequence may have a length (len) determined using the function len=$v \times Q_m \times N_{sc}/C$, where C is an integer and C≥1.

For example, when C=1, UE 120*a* may generate the PN sequence with a length len=$v \times Q_m \times N_{sc}$, and UE 120*a* may then modulate the PN sequence to $v \times N_{sc}$ modulation symbols, which may be sequentially mapped to each sub-carrier of a particular OFDM symbol used for AGC training for each of v ports. In another example, when C>1, the PN sequence may have a shorter length given by len=$v \times Q_m \times N_{sc}/C$, in which case UE 120*a* may modulate the PN sequence to $v \times N_{sc}/C$ modulation symbols, which may be mapped to each $C^{th}$ sub-carrier of a particular OFDM symbol used for AGC training for each of v ports. Furthermore, when $L_{AGC} > 1$, the modulation symbols may be repeated across the $L_{AGC}$ OFDM symbols.

Accordingly, in one example, the modulation order parameter may be predefined to be QPSK, in which case $Q_m$ has a value of 2, and a quantity of ports to be used to transmit the PN sequence may be fixed at one port. In this example, v equals one, so the PN sequence has a length given by len=$2 \times N_{sc}/C$. In this case, when C equals one, the length of the PN sequence is $2 \times N_{sc}$, which is then modulated to $N_{sc}$ QPSK symbols and sequentially mapped to each sub-carrier. Additionally, or alternatively, when C is greater than one, the length of the PN sequence is $2 \times N_{sc}/C$, which is modulated to $N_{sc}/C$ QPSK symbols and mapped to every $C^{th}$ sub-carrier (e.g., every other sub-carrier when C=2, every third sub-carrier when C=3, and/or the like).

As further shown in FIG. 5, and by reference number 504, UE 120a may transmit the modulated PN sequence to UE 120e on a sidelink in one or more earliest symbols of a slot to be used to transmit sidelink data. For example, in some aspects, UE 120a may transmit the modulated PN sequence in an earliest (i.e., first) $L_{AGC}$ OFDM symbol(s) of a slot when UE 120a is transmitting sidelink data in the slot, in which case each slot that includes sidelink data includes one or more earliest symbols that are dedicated to communicating a modulated PN sequence to be used for AGC training at UE 120e. In another example, when UE 120a employs slot aggregation or hybrid automatic repeat request (HARQ) retransmission (repetition) to transmit sidelink data across multiple consecutive slots, UE 120a may transmit the modulated PN sequence in the earliest available OFDM symbol(s) of only the first of the multiple consecutive slots. In some aspects, transmission of the PN sequence used for AGC training may be configured by a network node (e.g., a base station may send signaling to UE 120a and/or UE 120e to instruct UEs 120a, 120e to enable and/or disable the PN sequence transmission).

As further shown in FIG. 5, and by reference number 506, one or more AGC symbols carrying the PN sequence may be received by UE 120e, which may configure a gain for one or more receive components based on one or more signal characteristics associated with the AGC symbol(s). For example, UE 120e may be configured to use the earliest OFDM symbols in the slot for AGC training, and may therefore measure a received signal strength or received signal power for the earliest OFDM symbols that are carrying the PN sequence. Accordingly, UE 120e may use the measurements of received signal strength or received signal power for the earliest OFDM symbols in the slot and set the gain for the one or more receive components based on the measurements. Notably, UE 120e receiving the PN sequence may only measure the received signal power of the received PN sequence without demodulating the PN sequence. In this way, UE 120e may use the received PN sequence for AGC training purposes, whereby the gain that is configured based on the signal characteristics of the PN sequence may be applied to process subsequent symbols carrying sidelink data. Accordingly, as further shown in FIG. 5, and by reference number 508, UE 120a may transmit, on the sidelink, sidelink data in a set of symbols of the slot that are subsequent in time relative to the earliest symbol(s) used to transmit the PN sequence. For example, in some aspects, the sidelink data may include one or more information bits carried in a control channel (e.g., a physical sidelink control channel), one or more information bits carried in a shared channel (e.g., a physical sidelink shared channel), one or more information bits carried in a broadcast channel (e.g., a physical sidelink broadcast channel), one or more information bits carried in a feedback channel (e.g., a physical sidelink feedback channel), and/or the like. As further shown in FIG. 5, and by reference number 510, UE 120e may apply the gain that was configured based on the signal characteristics of the PN sequence to process the sidelink data.

As indicated above, FIG. 5 is provided as an example. Other examples may differ from what is described with respect to FIG. 5.

Figure 6:
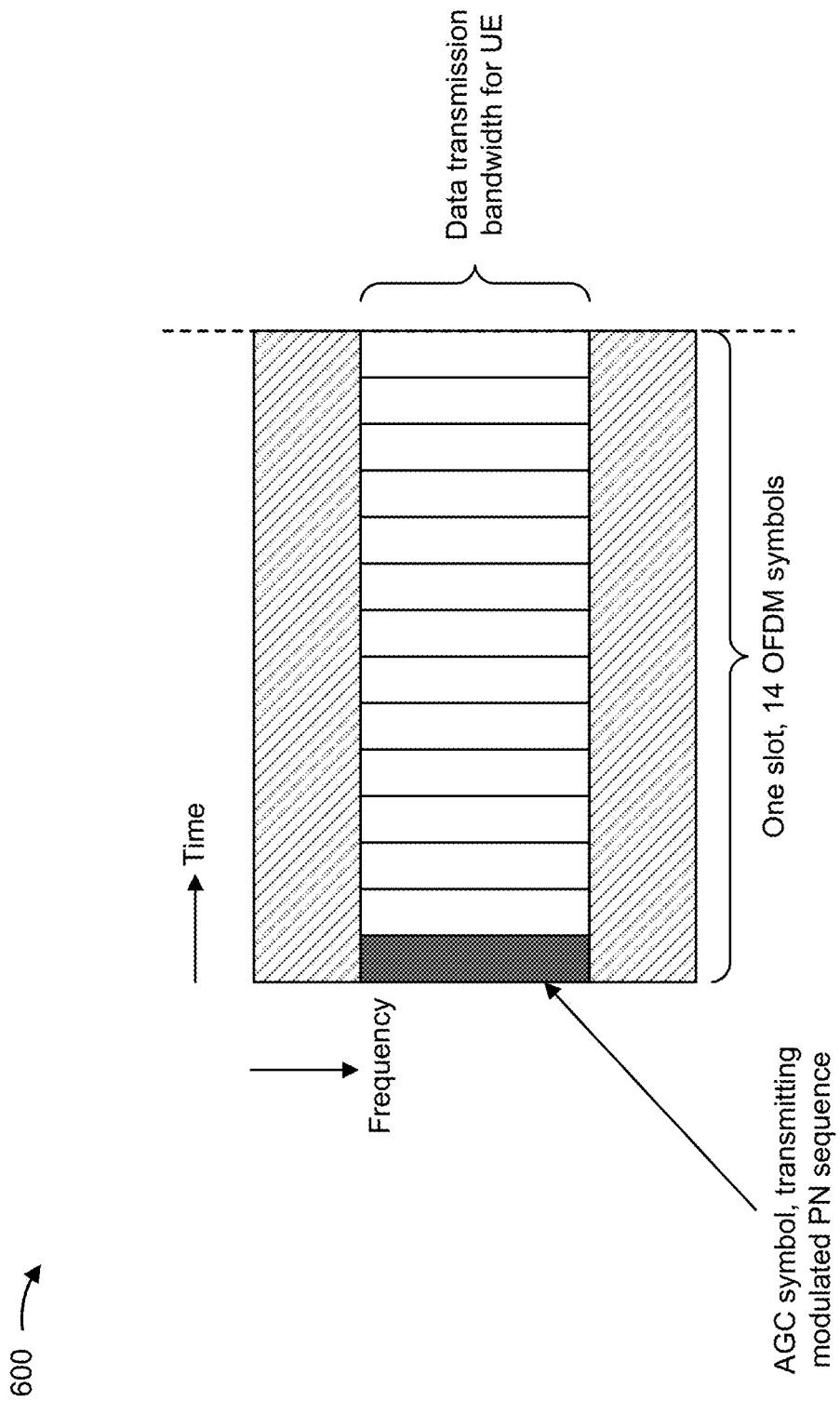
FIG. 6 is a block diagram illustrating an example slot structure for a single-slot transmission of a sequence for sidelink communications, in accordance with various aspects of the present disclosure.

FIG. 6 is a block diagram illustrating an example slot structure 600 for a single-slot transmission of a sequence for sidelink communications, in accordance with various aspects of the present disclosure. For example, in FIG. 6, a transmission slot includes fourteen OFDM symbols, and a transmitting UE has an available transmission bandwidth that includes a portion of frequency spectrum. In the example illustrated in FIG. 6, $L_{AGC}$ may have a value of one, whereby a first OFDM symbol in the slot (i.e., an earliest OFDM symbol in time) is dedicated to carrying a PN sequence to be used for AGC training at a receiving UE. Accordingly, the transmitting UE may generate a modulated PN sequence as described in further detail elsewhere herein and transmit the modulated PN sequence as an AGC symbol in the earliest symbol of the slot.

The AGC symbol may be received by the receiving UE, which may configure a gain for one or more receive components based on one or more signal characteristics (e.g., a received signal power) associated with the AGC symbol. Accordingly, when the transmitting UE transmits sidelink data in the remaining slots that are subsequent in time relative to the earliest slot used to communicate the modulated PN sequence, the receiving UE may apply the configured gain to process the sidelink data. Furthermore, if the receiving UE does not correctly receive the AGC symbol, there is no data loss because the AGC symbol does not carry any sidelink data.

As indicated above, FIG. 6 is provided as an example. Other examples may differ from what is described with respect to FIG. 6.

Figure 7:
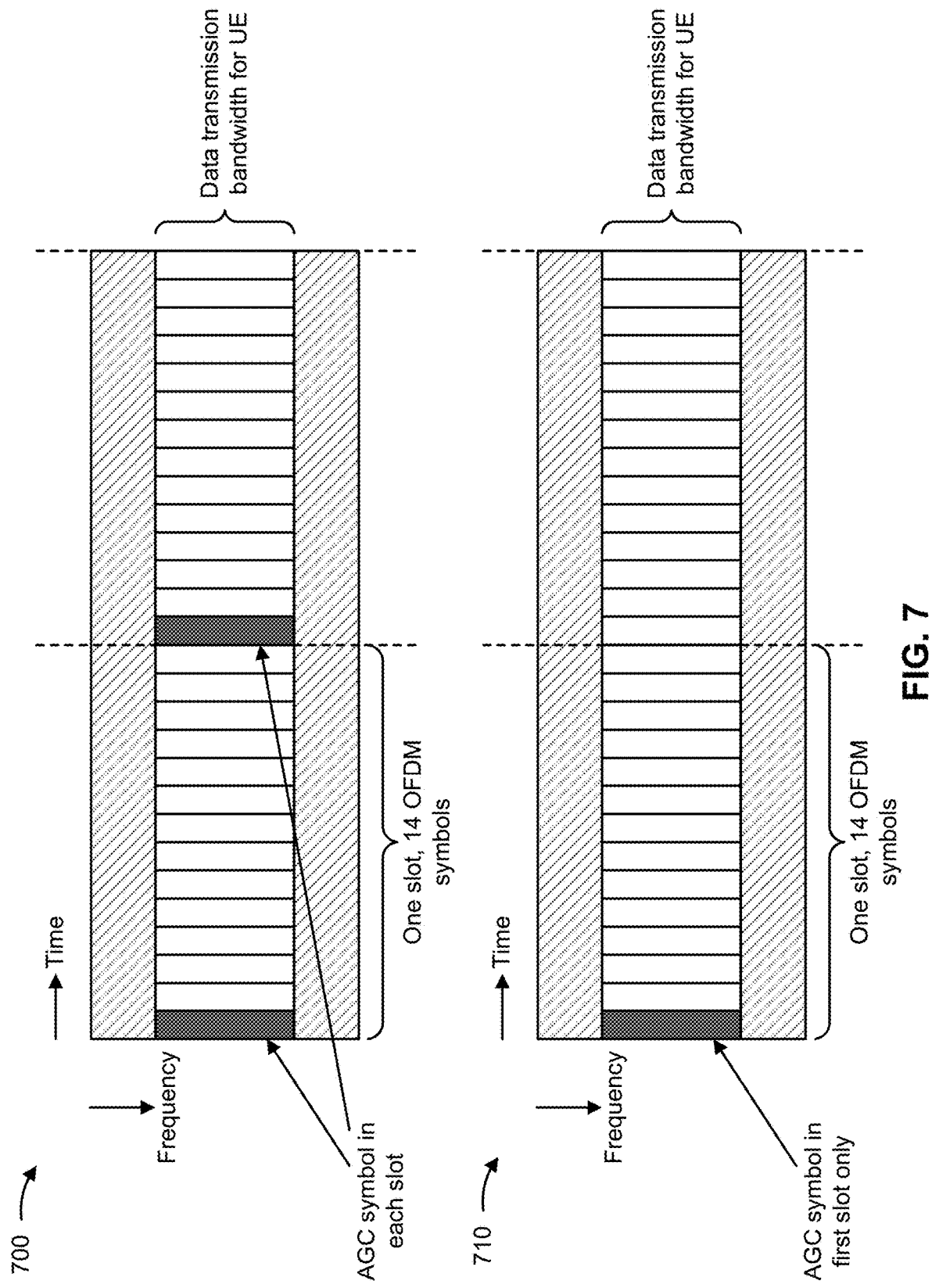
FIG. 7 is a block diagram illustrating an example slot structure for multi-slot transmissions of a sequence for sidelink communications, in accordance with various aspects of the present disclosure.

FIG. 7 is a block diagram illustrating an example slot structure for multi-slot transmissions for sidelink communications, in accordance with various aspects of the present disclosure. For example, as shown in FIG. 7, and by reference number 700, the multi-slot transmissions may be configured to dedicate the earliest $L_{AGC}$ symbols in each slot to AGC training, whereby a modulated PN sequence used for AGC training at a receiving UE may be communicated in the earliest $L_{AGC}$ symbols in each slot. Additionally, or alternatively, as shown by reference number 710, the multi-slot transmissions may be configured to dedicate the earliest $L_{AGC}$ symbols in only a first slot to AGC training, whereby a modulated PN sequence used for AGC training at a receiving UE may be communicated in the earliest $L_{AGC}$ symbols in the first slot and all remaining slots may be used to communicate sidelink data. In this case, because the multi-slot transmissions include two or more consecutive transmissions by a transmitting UE, there may be no apparent or significant fluctuations in received signal power and/or the like at the receiving UE across slots, whereby communicating the AGC symbol in subsequent slots may be unnecessary.

As indicated above, FIG. 7 is provided as an example. Other examples may differ from what is described with respect to FIG. 7.

Figure 8:
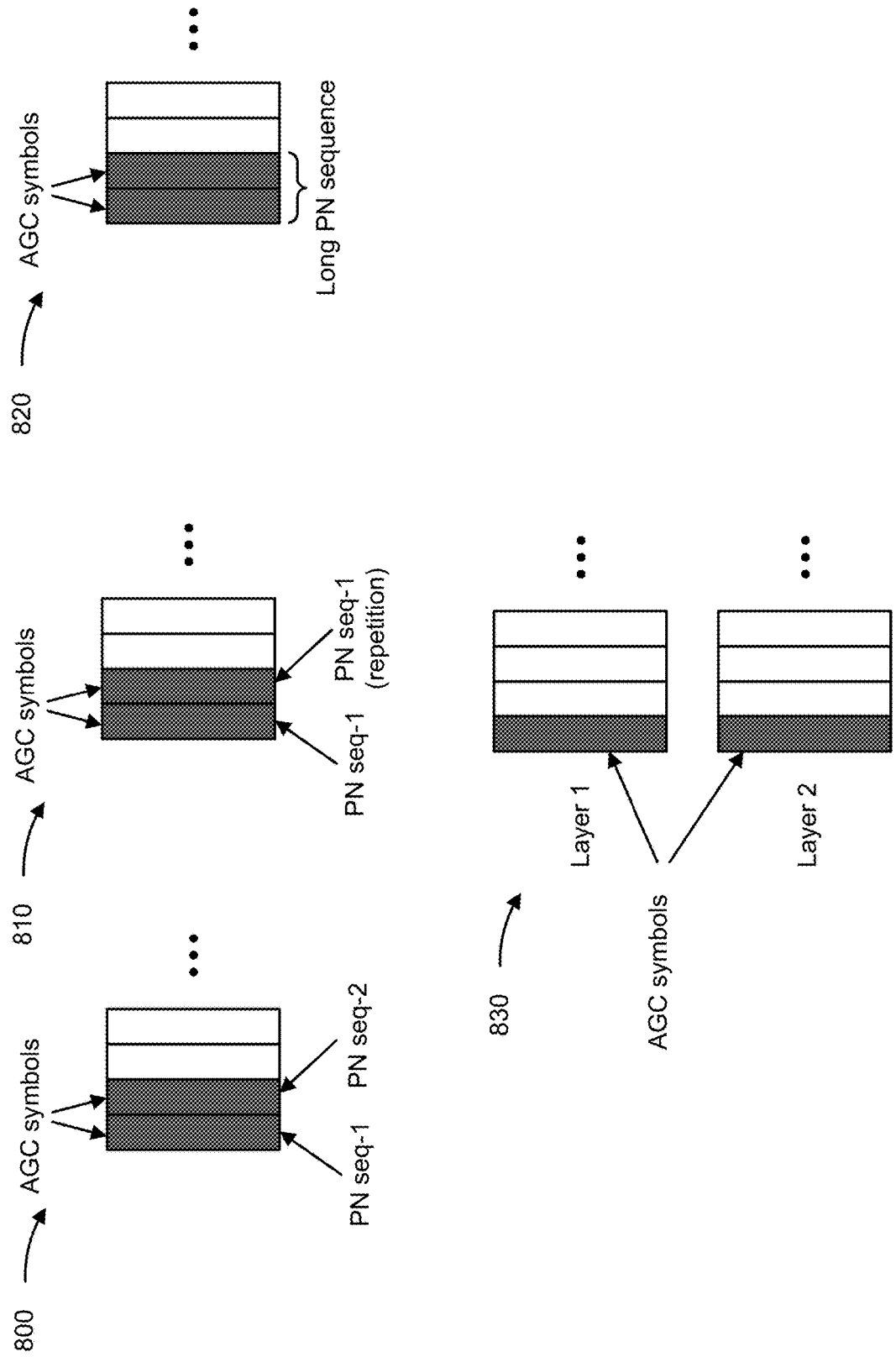
FIG. 8 is a block diagram illustrating an example slot structure for transmitting a sequence for sidelink communications in multiple symbols, in accordance with various aspects of the present disclosure.

FIG. 8 is a block diagram illustrating an example slot structure for transmitting a sequence for sidelink communications in multiple symbols, in accordance with various aspects of the present disclosure. In particular, the sequence may be transmitted in multiple symbols when $L_{AGC}$ is greater than one, when multiple antenna ports (or layers) are used to transmit the sequence, and/or the like. In some aspects, when the sequence is transmitted in multiple symbols, there are various possible slot configurations for communicating the sequence.

For example, as shown in FIG. 8, and by reference number 800, a plurality of earliest symbols in a slot (e.g., two in the illustrated example) may be used to communicate the PN sequence. In this case, the plurality of earliest symbols in the slot may correspond to AGC symbols, and different PN sequences may be generated for each of the plurality of symbols. For example, a first PN sequence may be transmitted in the first symbol of the slot, and a second PN sequence may be transmitted in the second symbol of the slot. Additionally, or alternatively, as shown by reference number 810, a single PN sequence may be generated and repeated for each of the plurality of AGC symbols that are earliest in time within the slot. For example, a transmitting UE may generate and modulate a PN sequence, which may be transmitted in the first symbol of the slot and transmitted again in the second symbol of the slot.

Additionally, or alternatively, as shown by reference number 820, a long PN sequence may be generated and transmitted across the plurality of AGC symbols that are earliest in time within the slot. For example, a transmitting UE may generate and modulate a PN sequence having a particular length that is based on a modulation order parameter ($Q_m$) for modulating the PN sequence, the quantity of earliest symbols in a slot to be dedicated to communicating the modulated PN sequence ($L_{AGC}$), a sidelink data channel transmission bandwidth ($N_{SC}$), a number of layers for the sidelink data transmission (v) (e.g., a number of antenna ports to be used to communicate the modulated PN sequence), and/or the like. In some cases, the PN sequence may have a length that exceeds a capacity of a single slot, in which case the transmitting UE may start to transmit a first set of bits associated with the modulated PN sequence in the first symbol of the slot and transmit a remaining set of bits in the second symbol of the slot.

As further shown in FIG. 8, and by reference number 830, a multi-layer or multi-port transmission may be used for the PN sequence. In this case, the transmitting UE may use the earliest $L_{AGC}$ symbols in a slot to transmit the PN sequence via multiple antenna ports, where the AGC symbol has the same layer and is transmitted on the same antenna ports as the sidelink data. In one example, when the PN sequence is a multi-port transmission, the PN sequence transmitted on different ports may be different. For example, when sidelink data is communicated via a two-layer transmission (e.g., using spatial multiplexing of two layers), the generated PN sequence may be different on the two ports. In some aspects, varying the generated PN sequence for the different ports can be achieved using a port-specific parameter (e.g., a port number or port index) to initialize the PN sequence to be transmitted on each respective port. In another example, when the PN sequence is a multi-port transmission, the PN sequence transmitted on different ports may be the same. For example, when a data transmission mode is Space-Frequency Block Code (SFBC), data transmitted on multiple (e.g., two) ports may be generated from the same data using SFBC precoding techniques. In this case, the PN sequence may be generated with an assumption that the PN sequence will be a one-layer transmission (i.e., v=1) and then precoded using the same technique as data.

As indicated above, FIG. 8 is provided as an example. Other examples may differ from what is described with respect to FIG. 8.

Figure 9:
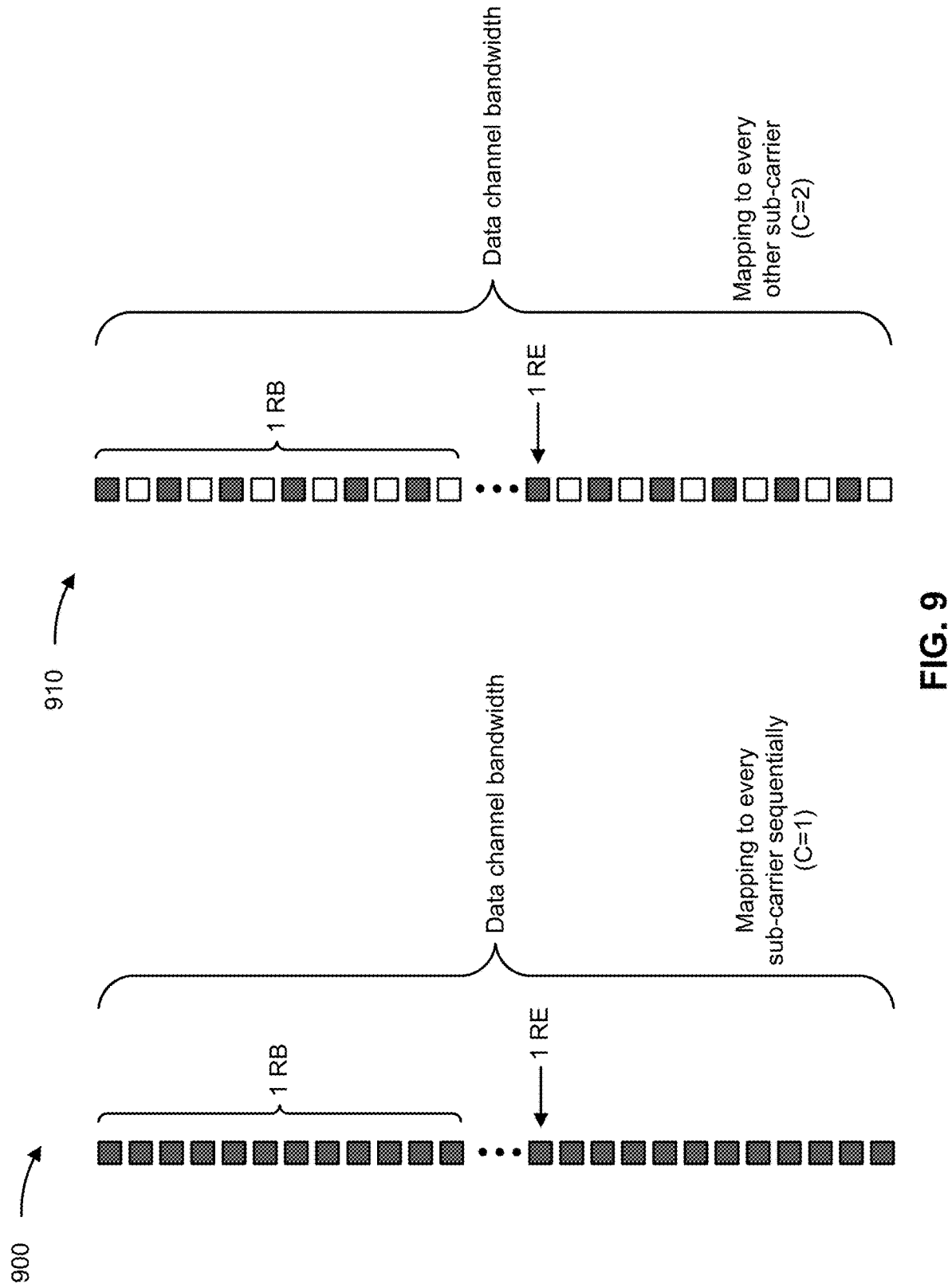
FIG. 9 is a block diagram illustrating an example resource element mapping for transmitting a sequence for sidelink communications, in accordance with various aspects of the present disclosure.

FIG. 9 is a block diagram illustrating an example resource element mapping for transmitting a sequence for sidelink communications, in accordance with various aspects of the present disclosure. As shown in FIG. 9, a data channel bandwidth may be partitioned into resource blocks, each of which include a set of resource elements (REs). In general, as mentioned above, a PN sequence may have a length that is based on a parameter C, which is an integer having a value greater than or equal to one based on a mapping between AGC symbol and sub-carriers. In particular, as mentioned elsewhere herein, AGC symbols may be mapped to every $C^{th}$ sub-carrier. Accordingly, as shown in FIG. 9, and by reference number 900, each RE may be sequentially mapped to an AGC symbol (i.e., an OFDM symbol used to communicate a PN sequence used for AGC training) in cases where C=1. As further shown in FIG. 9, and by reference number 910, every other RE may be mapped to an AGC symbol in cases where C=2. In this case, assuming that the data channel bandwidth is the same for both mappings, the length of the PN sequence in cases where each RE is sequentially mapped to an AGC symbol may be double the length of the PN sequence in cases where every other RE is mapped to an AGC symbol.

As indicated above, FIG. 9 is provided as an example. Other examples may differ from what is described with respect to FIG. 9.

Figure 10:
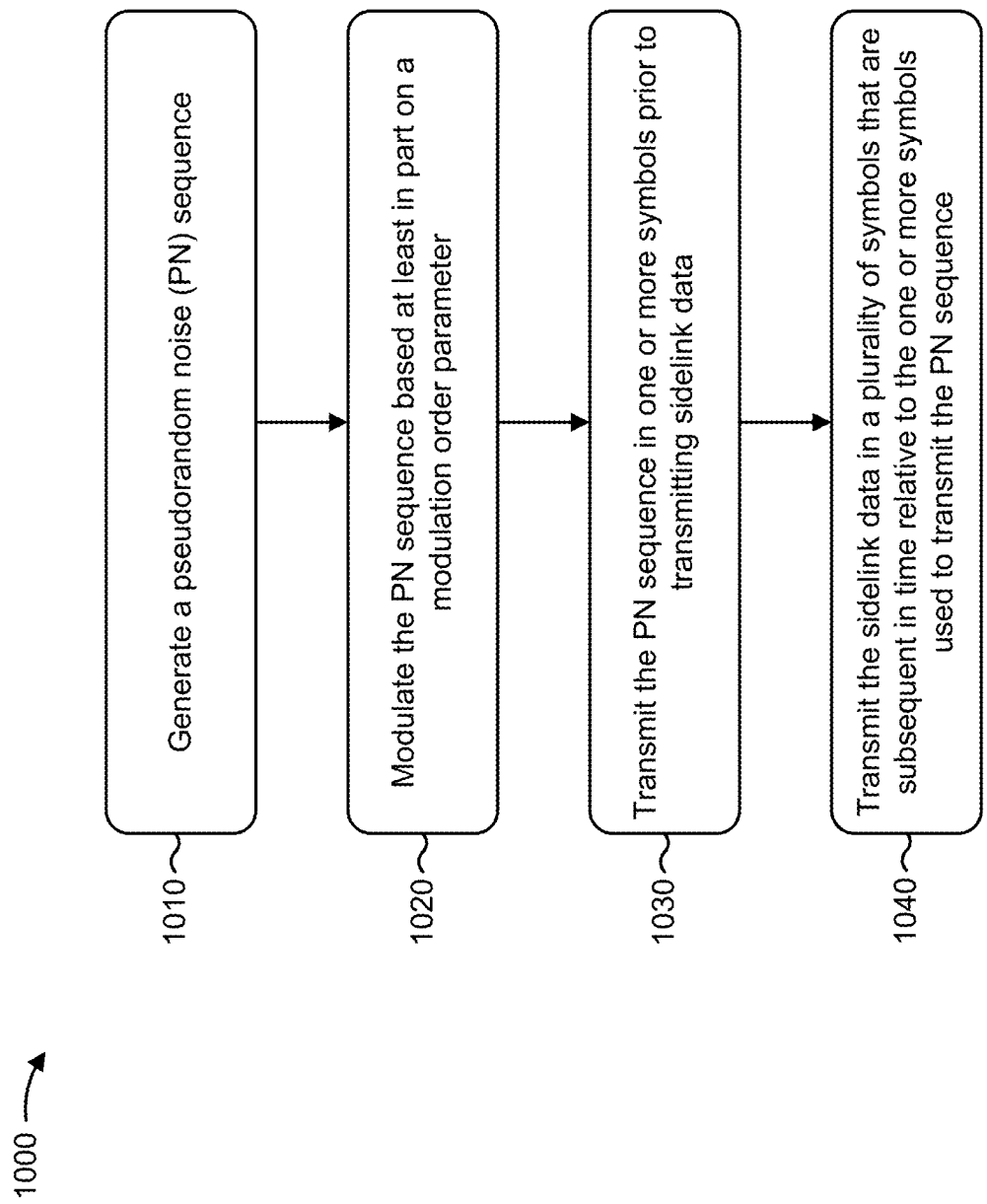
FIGS. 10 and 11 are diagrams illustrating example processes relating to sequence transmission for sidelink communications, in accordance with various aspects of the present disclosure.

FIG. 10 is a diagram illustrating an example process 1000 performed, for example, by a UE, in accordance with various aspects of the present disclosure. Example process 1000 is an example where a UE (e.g., UE 120a and/or the like) performs operations associated with sequence transmission for sidelink communications.

As shown in FIG. 10, in some aspects, process 1000 may include generating a PN sequence (block 1010). For example, the UE (e.g., using transmit processor 264, controller/processor 280, memory 282, and/or the like) may generate a PN sequence, as described above.

As shown in FIG. 10, in some aspects, process 1000 may include modulating the PN sequence based at least in part on a modulation order parameter (block 1020). For example, the UE (e.g., using modulator(s) 254, transmit processor 264, controller/processor 280, memory 282, and/or the like) may modulate the PN sequence based at least in part on a modulation order parameter, as described above.

As further shown in FIG. 10, in some aspects, process 1000 may include transmitting the PN sequence in one or more symbols prior to transmitting sidelink data (block 1030). For example, the UE (e.g., using antenna 252, transmit processor 264, controller/processor 280, memory 282, and/or the like) may transmit the PN sequence in one or more symbols prior to transmitting sidelink data, as described above.

As further shown in FIG. 10, in some aspects, process 1000 may include transmitting the sidelink data in a plurality of symbols that are subsequent in time relative to the one or more symbols used to transmit the PN sequence (block 1040). For example, the UE (e.g., using antenna 252, transmit processor 264, controller/processor 280, memory 282, and/or the like) may transmit the sidelink data in a plurality of symbols that are subsequent in time relative to the one or more symbols used to transmit the PN sequence, as described above.

Process 1000 may include additional aspects, such as any single aspect or any combination of aspects described below and/or in connection with one or more other processes described elsewhere herein.

In a first aspect, the one or more symbols are dedicated to transmitting the PN sequence to enable AGC training at a receiver device prior to reception of the sidelink data at the receiver device.

In a second aspect, alone or in combination with the first aspect, a quantity of the one or more symbols that are used to transmit the PN sequence is based at least in part on a subcarrier spacing.

In a third aspect, alone or in combination with one or more of the first and second aspects, the PN sequence is based at least in part on at least one maximum length sequence that is initialized according to an initial sequence state that is based at least in part on a set of one or more parameters.

In a fourth aspect, alone or in combination with one or more of the first through third aspects, the set of one or more parameters include one or more of an index associated with a frame that includes a slot in which the PN sequence is transmitted, an index associated with the slot in which the PN sequence is transmitted, an index associated with the one or more symbols in which the PN sequence is transmitted, an index associated with an antenna port used to transmit the PN sequence, a configured identification, an index associated with a sub-channel used to transmit the PN sequence, an identification of the UE, a parameter including one or more integer values, or a random number.

In a fifth aspect, alone or in combination with one or more of the first through fourth aspects, the modulation order parameter has a value based at least in part on a predefined quadrature modulation scheme.

In a sixth aspect, alone or in combination with one or more of the first through fifth aspects, the modulation order parameter has a value based at least in part on a quadrature modulation scheme used to transmit the sidelink data.

In a seventh aspect, alone or in combination with one or more of the first through sixth aspects, the PN sequence is transmitted on a fixed quantity of antenna ports.

In an eighth aspect, alone or in combination with one or more of the first through seventh aspects, the PN sequence and the sidelink data are transmitted using an equal quantity of antenna ports.

In a ninth aspect, alone or in combination with one or more of the first through eighth aspects, the PN sequence and the sidelink data are transmitted using a same set of antenna ports.

In a tenth aspect, alone or in combination with one or more of the first through ninth aspects, the PN sequence is transmitted using precoding to be applied to the sidelink data.

In an eleventh aspect, alone or in combination with one or more of the first through tenth aspects, the PN sequence has a length based at least in part on the modulation order parameter, a quantity of antenna ports used to transmit the sidelink data, and an available transmission bandwidth for the sidelink data.

In a twelfth aspect, alone or in combination with one or more of the first through eleventh aspects, the PN sequence has a length based at least in part on the modulation order parameter, a quantity of antenna ports used to transmit the sidelink data, an available transmission bandwidth for the sidelink data, and a positive integer based at least in part on a mapping between symbols of the modulated PN sequence and a set of subcarriers.

In a thirteenth aspect, alone or in combination with one or more of the first through twelfth aspects, the PN sequence has a length based at least in part on the modulation order parameter, a quantity of antenna ports used to transmit the sidelink data, an available transmission bandwidth for the sidelink data, a first positive integer based at least in part on a mapping between symbols of the modulated PN sequence and a set of subcarriers, and a second positive integer that is based at least in part on a quantity of the one or more symbols that are used to transmit the PN sequence.

In a fourteenth aspect, alone or in combination with one or more of the first through thirteenth aspects, a transmission of the PN sequence is repeated in one or more symbols of one or more subsequent slots in which the UE transmits the sidelink data.

In a fifteenth aspect, alone or in combination with one or more of the first through fourteenth aspects, when the UE transmits the sidelink data in multiple consecutive slots, the PN sequence is transmitted in only a first one of the multiple consecutive slots.

In a sixteenth aspect, alone or in combination with one or more of the first through fifteenth aspects, the UE receives, from a network node, a signaling message related to subsequent transmissions of the PN sequence and disables the subsequent transmissions of the PN sequence based at least in part on the signaling message.

In a seventeenth aspect, alone or in combination with one or more of the first through sixteenth aspects, the sidelink data includes one or more information bits carried in one or more of a control channel, a shared channel, a broadcast channel, or a feedback channel.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
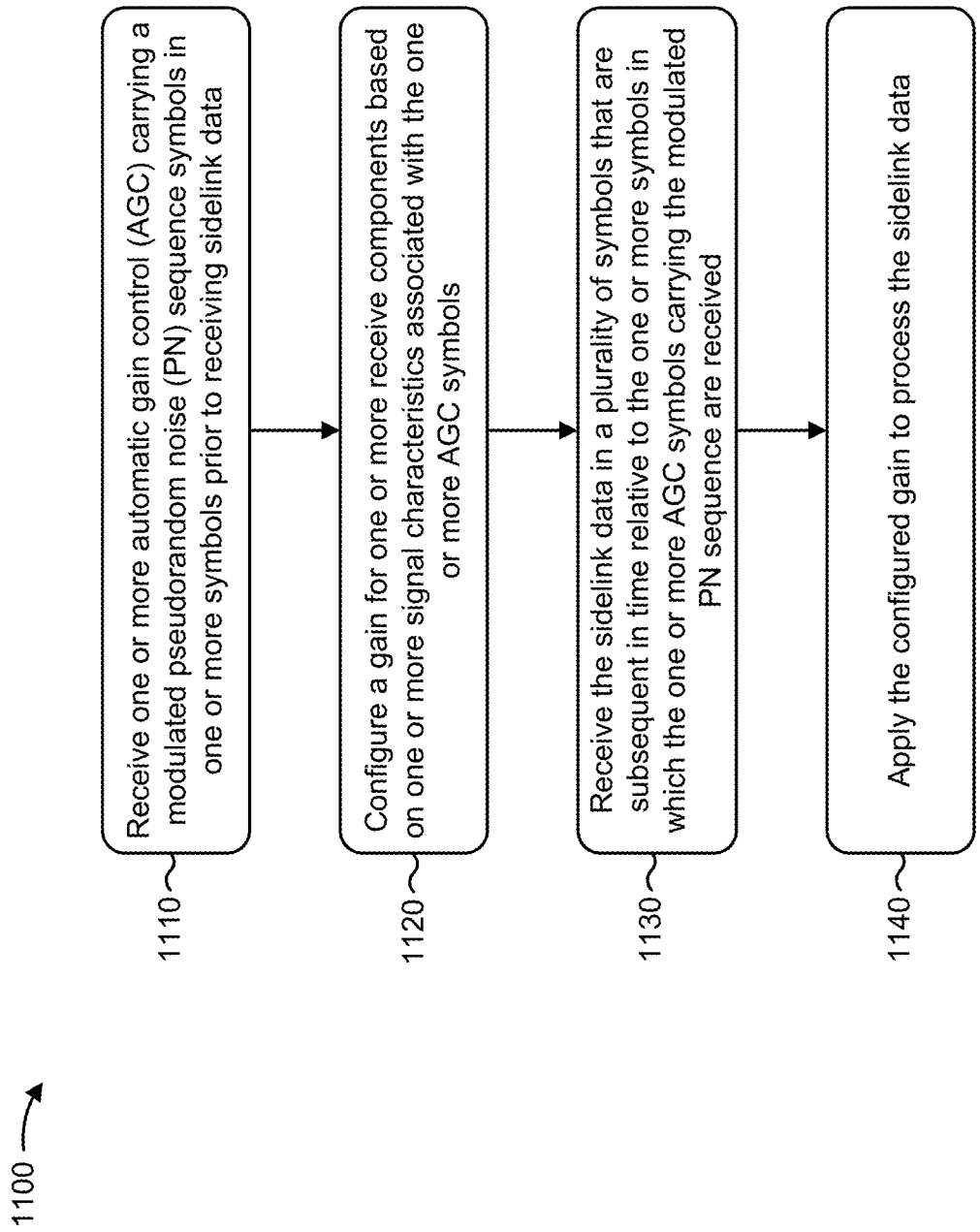

FIG. 11 is a diagram illustrating an example process 1100 performed, for example, by a UE, in accordance with various aspects of the present disclosure. Example process 1100 is an example where a user equipment (e.g., UE 120*e* and/or the like) performs operations associated with sequence transmission for sidelink communications.

As shown in FIG. 11, in some aspects, process 1100 may include receiving one or more AGC symbols carrying a modulated PN sequence in one or symbols prior to receiving sidelink data (block 1110). For example, the UE (e.g., using antenna 252, receive processor 258, controller/processor 280, memory 282, and/or the like) may receive one or more AGC training symbols carrying a modulated PN sequence in one or more symbols prior to receiving sidelink data, as described above.

As further shown in FIG. 11, in some aspects, process 1100 may include configuring a gain for one or more receive components based on one or more signal characteristics associated with the one or more AGC symbols (block 1120). For example, the UE (e.g., using receive processor 258, controller/processor 280, memory 282, and/or the like) may configure a gain for one or more receive components based on one or more signal characteristics associated with the one or more AGC symbols, as described above.

As further shown in FIG. 11, in some aspects, process 1100 may include receiving the sidelink data in a plurality of symbols that are subsequent in time relative to the one or more symbols in which the one or more AGC symbols carrying the modulated PN sequence are received (block 1130). For example, the UE (e.g., using antenna 252, receive processor 258, controller/processor 280, memory 282, and/or the like) may receive the sidelink data in a plurality of symbols that are subsequent in time relative to the one or more symbols in which the one or more AGC symbols carrying the modulated PN sequence are received, as described above.

As further shown in FIG. 11, in some aspects, process 1100 may include applying the configured gain to process the sidelink data (block 1140). For example, the UE (e.g., using receive processor 258, controller/processor 280, memory 282, and/or the like) may apply the configured gain to process the sidelink data, as described above.

Process 1100 may include additional aspects, such as any single aspect or any combination of aspects described below and/or in connection with one or more other processes described elsewhere herein.

In a first aspect, the one or more signal characteristics include a received signal power associated with the one or more AGC symbols.

In a second aspect, alone or in combination with the first aspect, the one or more AGC symbols are dedicated to carrying the modulated PN sequence to enable AGC training at the UE prior to the UE receiving the sidelink data.

In a third aspect, alone or in combination with one or more of the first and second aspects, a quantity of the one or more AGC symbols carrying the modulated PN sequence is based at least in part on a subcarrier spacing.

In a fourth aspect, alone or in combination with one or more of the first through third aspects, a transmission of the one or more AGC symbols is repeated across multiple slots in which the UE receives the sidelink data.

In a fifth aspect, alone or in combination with one or more of the first through fourth aspects, when the UE receives the sidelink data in multiple consecutive slots, the one or more AGC symbols are received in only a first one of the multiple consecutive slots.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   generating a pseudorandom noise (PN) sequence;
   modulating the PN sequence, based at least in part on a modulation order parameter, to generate a modulated PN sequence;
   transmitting the modulated PN sequence in one or more symbols prior to transmitting sidelink data; and
   transmitting the sidelink data in a plurality of symbols that are subsequent in time relative to the one or more symbols used to transmit the modulated PN sequence.

2. The method of claim 1, wherein the one or more symbols are dedicated to transmitting the PN sequence to enable automatic gain control (AGC) training at a receiver device prior to reception of the sidelink data at the receiver device.

3. The method of claim 1, wherein a quantity of the one or more symbols that are used to transmit the PN sequence is based at least in part on a subcarrier spacing.

4. The method of claim 1, wherein the PN sequence is based at least in part on at least one maximum length sequence that is initialized according to an initial sequence state that is based at least in part on a set of one or more parameters.

5. The method of claim 4, wherein the set of one or more parameters include one or more of an index associated with a frame that includes a slot in which the PN sequence is transmitted, an index associated with the slot in which the PN sequence is transmitted, an index associated with the one or more symbols in which the PN sequence is transmitted, an index associated with an antenna port used to transmit the PN sequence, a configured identification, an index associated with a sub-channel used to transmit the PN sequence, an identification of the UE, a parameter including one or more integer values, or a random number.

6. The method of claim 1, wherein the modulation order parameter has a value based at least in part on a predefined quadrature modulation scheme or a quadrature modulation scheme used to transmit the sidelink data.

7. The method of claim 1, wherein the PN sequence is transmitted using one or more of a fixed quantity of antenna ports or precoding to be applied to the sidelink data.

8. The method of claim 1, wherein the PN sequence and the sidelink data are transmitted using one or more of an equal quantity of antenna ports or a same set of antenna ports.

9. The method of claim 1, wherein the PN sequence has a length based at least in part on the modulation order parameter, a quantity of antenna ports used to transmit the sidelink data, and an available transmission bandwidth for the sidelink data.

10. The method of claim 9, wherein the length of the PN sequence is further based at least in part on one or more of a first positive integer that is based at least in part on a mapping between symbols of the modulated PN sequence and a set of subcarriers or a second positive integer that is based at least in part on a quantity of the one or more symbols that are used to transmit the PN sequence.

11. The method of claim 1, wherein a transmission of the PN sequence is repeated in one or more symbols of one or more subsequent slots in which the UE transmits the sidelink data.

12. The method of claim 1, wherein, when the UE transmits the sidelink data in multiple consecutive slots, the PN sequence is transmitted in only a first one of the multiple consecutive slots.

13. The method of claim 1, further comprising:
receiving, from a network node, a signaling message related to subsequent transmissions of the PN sequence; and
disabling the subsequent transmissions of the PN sequence based at least in part on the signaling message.

14. The method of claim 1, wherein the sidelink data includes one or more information bits carried in one or more of a control channel, a shared channel, a broadcast channel, or a feedback channel.

15. The method of claim 1, wherein the modulated PN sequence and the sidelink data are transmitted on a sidelink to another UE.

16. The method of claim 1, wherein the one or more symbols do not contain sidelink data.

17. The method of claim 1, wherein the one or more symbols are the earliest in time in a slot.

18. The method of claim 17, wherein the slot is a first slot of multiple consecutive slots.

19. The method of claim 17, wherein the plurality of symbols is in the slot.

20. The method of claim 1, wherein the one or more symbols, prior to transmitting the sidelink data, and the plurality of symbols, subsequent in time relative to the one or more symbols used to transmit the modulated PN sequence, are orthogonal frequency division multiplexing (OFDM) symbols.

21. A user equipment (UE) for wireless communication, comprising:
a memory; and
one or more processors operatively coupled to the memory, the memory and the one or more processors configured to:
generate a pseudorandom noise (PN) sequence;
modulate the PN, based at least in part on a modulation order parameter, to generate a modulated PN sequence;
transmit the modulated PN sequence in one or more symbols prior to transmitting sidelink data; and
transmit the sidelink data in a plurality of symbols that are subsequent in time relative to the one or more symbols used to transmit the modulated PN sequence.

22. The UE of claim 21, wherein the one or more symbols are dedicated to transmitting the PN sequence to enable automatic gain control (AGC) training at a receiver device prior to reception of the sidelink data at the receiver device.

23. The UE of claim 21, wherein a quantity of the one or more symbols that are used to transmit the PN sequence is based at least in part on a subcarrier spacing.

24. The UE of claim 21, wherein a transmission of the PN sequence is repeated in one or more symbols of one or more subsequent slots in which the UE transmits the sidelink data.

25. The UE of claim 21, wherein, when the sidelink data is transmitted in multiple consecutive slots, the PN sequence is transmitted in only a first one of the multiple consecutive slots.

26. The UE of claim 21, wherein the modulated PN sequence and the sidelink data are transmitted on a sidelink to another UE.

27. The UE of claim 21, wherein the one or more symbols do not contain any sidelink data.

28. The UE of claim 21, wherein the one or more symbols are the earliest in time in a slot, and where the plurality of symbols is in the slot.

29. A non-transitory computer-readable medium storing a set of instructions for wireless communication, the set of instructions comprising:
one or more instructions that, when executed by one or more processors of a user equipment (UE), cause the UE to:
generate a pseudorandom noise (PN) sequence;
modulate the PN sequence, based at least in part on a modulation order parameter, to generate a modulated PN sequence;
transmit the modulated PN sequence in one or more symbols prior to transmitting sidelink data; and
transmit the sidelink data in a plurality of symbols that are subsequent in time relative to the one or more symbols used to transmit the modulated PN sequence.

30. An apparatus for wireless communication, comprising:
means for generating a pseudorandom noise (PN) sequence;
means for modulating the PN sequence, based at least in part on a modulation order parameter, to generate a modulated PN sequence;
means for transmitting the modulated PN sequence in one or more symbols prior to transmitting sidelink data; and
means for transmitting the sidelink data in a plurality of symbols that are subsequent in time relative to the one or more symbols used to transmit the modulated PN sequence.

* * * * *